United States Patent
Käske

(10) Patent No.: US 6,962,169 B2
(45) Date of Patent: Nov. 8, 2005

(54) DEVICE FOR GENERATING A PULSATING STREAM OF FLUID

(75) Inventor: Egon Käske, Aachen (DE)

(73) Assignee: Durr Ecoclean GmbH, Filderstadt (DE)

( * ) Notice: Subject to any disclaimer, the term of this patent is extended or adjusted under 35 U.S.C. 154(b) by 0 days.

(21) Appl. No.: 10/812,136

(22) Filed: Mar. 29, 2004

(65) Prior Publication Data

US 2004/0221900 A1    Nov. 11, 2004

Related U.S. Application Data

(63) Continuation of application No. PCT/EP02/01372, filed on Feb. 9, 2002.

(30) Foreign Application Priority Data

Oct. 24, 2001  (DE)  ................................ 101 51 864

(51) Int. Cl.$^7$ ............................................. F16K 31/04

(52) U.S. Cl. .................... 137/624.13; 95/280

(58) Field of Search ............... 137/624.13, 624.15, 137/624.16, 624.11, 625.47, 625; 95/273, 95/280

(56) References Cited

U.S. PATENT DOCUMENTS

| 2,879,797 | A |   | 3/1959 | Guaraldi |
| 3,314,643 | A |   | 4/1967 | Sachnik |
| 3,937,252 | A |   | 2/1976 | Ishida |
| 4,649,955 | A |   | 3/1987 | Otto et al. |
| 4,802,508 | A |   | 2/1989 | Styles et al. |
| 5,143,121 | A | * | 9/1992 | Steinhardt et al. ...... 137/624.13 |
| 5,148,946 | A |   | 9/1992 | Mizuta et al. |
| 6,053,203 | A | * | 4/2000 | Sailor et al. ........... 137/624.13 |
| 6,641,646 | B2 | * | 11/2003 | Rosenberg .................... 95/280 |

FOREIGN PATENT DOCUMENTS

DE             36 27 328 A1     2/1988

\* cited by examiner

*Primary Examiner*—Kevin Lee
(74) *Attorney, Agent, or Firm*—Leydig, Voit & Mayer, Ltd.

(57) ABSTRACT

In order to provide a device for producing a pulsating fluid stream, which is of simple construction and is easily producible and which enables a pulsating fluid stream to be produced at a comparatively high frequency, there is proposed a device for producing a pulsating fluid stream which comprises a fluid inlet, a fluid outlet and a blocking element that is arranged between the fluid inlet and the fluid outlet and is rotatable about a rotational axis, wherein the blocking element comprises a blocking member which cyclically closes and opens a fluid passage from the fluid inlet to the fluid outlet.

14 Claims, 4 Drawing Sheets

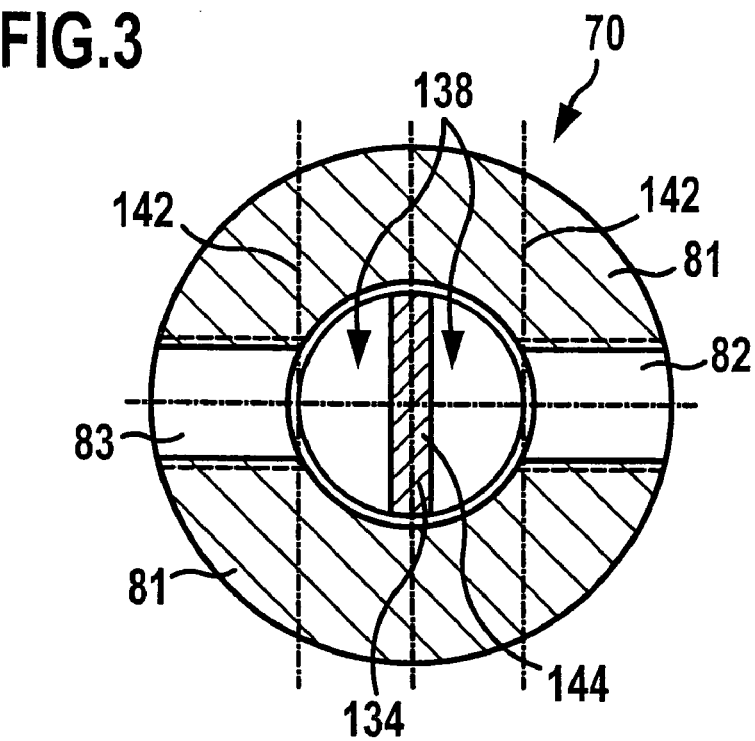
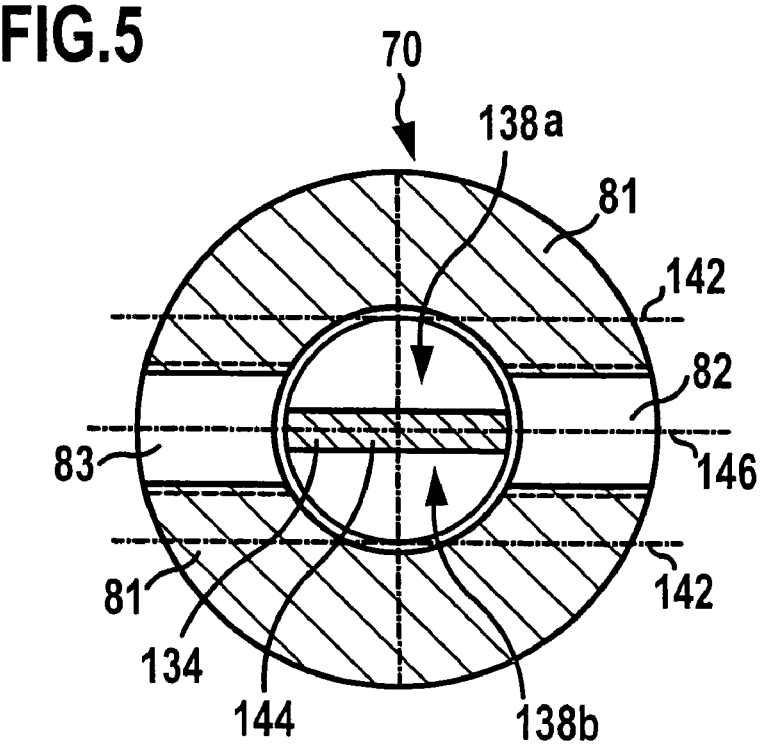

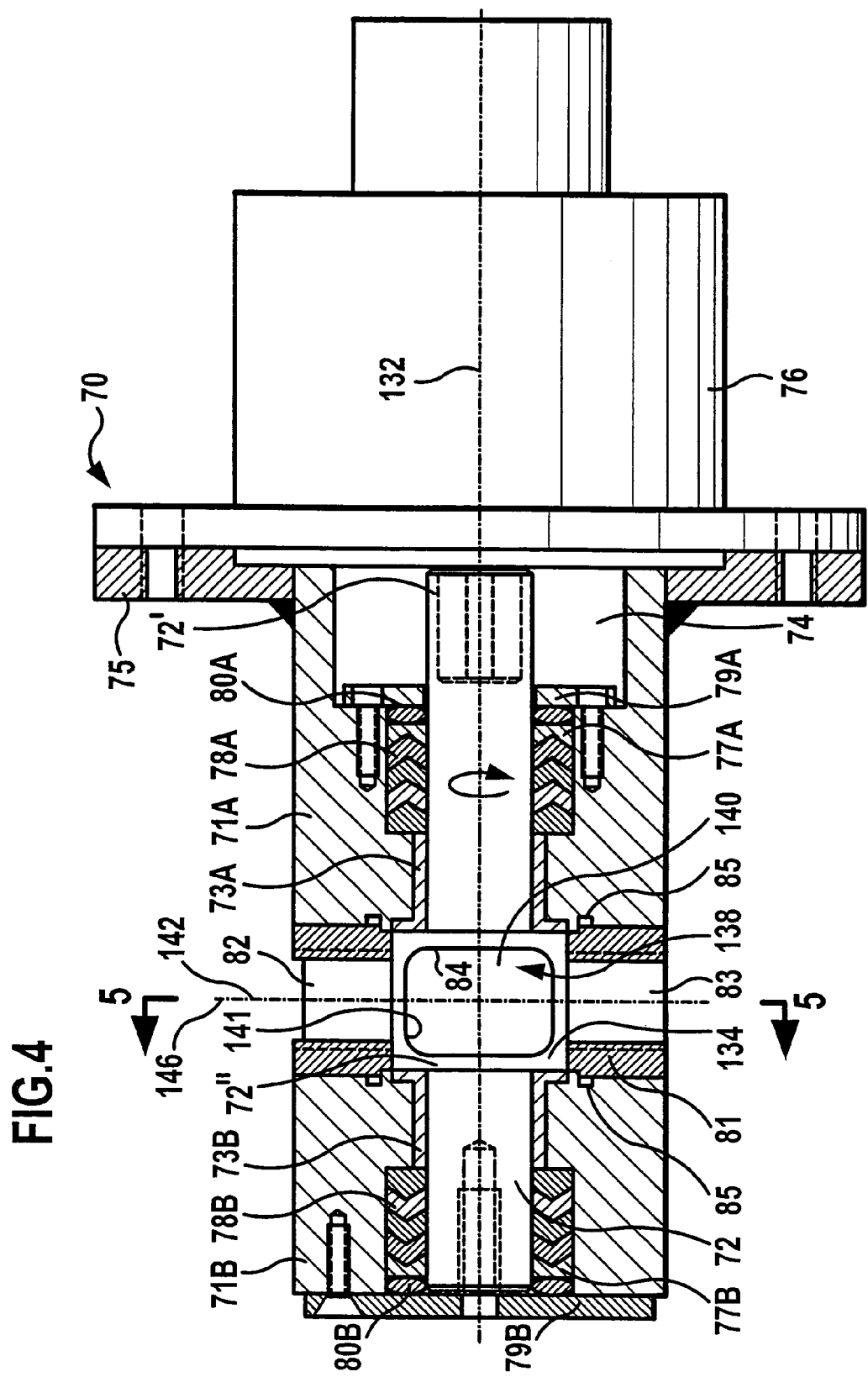

DEVICE FOR GENERATING A PULSATING STREAM OF FLUID

The present dislcosure relates to the subject matter disclosed in German Patent Application No. 101 51 864.1 of Oct. 24, 2001, the entire specification of which is incorporated herein by reference.

FIELD AND BACKGROUND OF THE INVENTION

The present invention relates to a device for producing a pulsating fluid stream, wherein the fluid stream may be a stream of liquid and/or a gas.

SUMMARY AND OBJECTS OF THE INVENTION

Such a pulsating fluid stream can be produced by means of a valve which is arranged in a pipeline through which the fluid will flow, and which alternately closes and opens a passage through the valve.

The object of the present invention is to provide a device for producing a pulsating fluid stream which is of simple construction and is easily manufacturable and which enables the production of a fluid stream that pulsates at a comparatively high frequency.

In accordance with the invention, this object is achieved by a device for producing a pulsating fluid stream which comprises a fluid inlet, a fluid outlet and a blocking element that is arranged between the fluid inlet and the fluid outlet and is rotatable about a rotational axis, wherein the blocking element comprises a blocking member which cyclically closes and opens a fluid passage from the fluid inlet to the fluid outlet.

In the device in accordance with the invention, the pulsating frequency of the resultant pulsating fluid stream corresponds to twice the rotational frequency of the blocking element. The pulsating frequency of the fluid stream can thus be adjusted in a simple manner by suitable choice of the rotational frequency of the blocking element.

In a preferred embodiment of the invention, provision is made for the blocking element to be in the form of a rotatably mounted shaft.

Furthermore, provision is preferably made for the blocking element to comprise a substantially cylindrical blocking member.

In order to enable the passage of the fluid from the fluid inlet to the fluid outlet when the device is in an open position, the blocking member is provided with at least one recess.

This recess may be in the form of a through passage opening through the blocking member which opens-out into the outer surface of the blocking element at two mutually separate locations.

In this case, provision is preferably made for the through passage opening to intersect the rotational axis of the blocking element.

If the blocking element is rotationally symmetrical, then the passage opening is preferably aligned radially relative to the axis of symmetry of the blocking element.

However, a blocking member which comprises at least one recess in the form of a depression in the outer surface of the blocking element has proved to be more expedient than a blocking member having a radial passage boring. In comparison with a blocking member having a radial passage boring, a blocking member incorporating such a depression enables the device to attain substantially faster opening and closing times for the same rotational speed of the blocking element.

It is particularly expedient, if the blocking member comprises at least two recesses in the form of depressions which are preferably arranged at mutually opposite sides of the blocking element.

In a preferred embodiment of the invention, the cross-section of the depression is substantially in the form of a segment of a circle, said depression preferably having a substantially semi-circular cross-section.

Furthermore, provision is preferably made for the recess not to intersect the rotational axis of the blocking element. In this way, there will remain in the vicinity of the rotational axis of the blocking element a web portion which blocks the fluid passage in the closed position of the device.

The geometry of the blocking member will be particularly expedient and the blocking member particularly easy to manufacture, if the depression comprises a boundary surface which is substantially in the form of a surface section of a cylinder. Such a depression can be made in a particularly simple manner by milling out the blocking member from a cylindrical blank.

In order to impede the passage of fluid from the fluid inlet to the fluid outlet to as little an extent as possible in the open position of the device, it is advantageous for the depression to extend substantially perpendicularly relative to a radial direction of the blocking element.

Furthermore, the depression preferably extends substantially perpendicularly relative to the rotational axis of the blocking element.

Furthermore, it is of advantage, if the rotational axis of the blocking element is aligned transversely, preferably substantially perpendicularly, relative to the mean direction of flow of the fluid through the device.

If the fluid inlet and the fluid outlet extend along a common axis, then the rotational axis of the blocking element is preferably aligned substantially perpendicularly relative to this common axis of the fluid inlet and the fluid outlet.

In practice, it has proved expedient if the blocking element is rotated at a rotational speed that preferably lies within the range of approximately 100 rpm to approximately 10,000 rpm, and preferably within the range of approximately 300 rpm to approximately 3,000 rpm.

In order to produce a fluid stream which is pulsated at as constant a frequency as possible, it is expedient if the device comprises a rotary drive for the blocking element, said drive having an adjustable rotational speed.

The rotary drive for the blocking element can, in particular, be a pneumatic, hydraulic or electrical rotary drive.

Claim 13 is directed toward a filter device which comprises a device for producing a pulsating fluid stream in accordance with the invention which is used for the purposes of cleaning, and in particular for back-washing, a filter.

When back-washing filter cloths, the device in accordance with the invention applies pressure surges to the surface of the filter cloth thereby loosening the particles that have been deposited on the filter cloth. At the same time, due to the flow rate of the back-washing medium flowing through the device as a result of the pulsating fluid stream, a current-flow is obtained from the clean side of the filter to the dirty side thereof. The particles loosened by the pressure peaks are rinsed out of the filter in this way.

Claim 14 is directed toward a cleaning device which comprises a unit for producing a pulsating jet of cleaning agent which, for its part, comprises a device for producing a pulsating fluid stream in accordance with the invention.

Dirt particles can be removed more effectively from a work piece requiring cleaning by the use of a pulsating jet of cleaning agent as compared with the use of a non-pulsating jet of cleaning agent.

In particular, such a pulsating jet of cleaning agent can be employed for washing down a work piece requiring cleaning in a flood injection washing process (wherein the workpieces requiring cleaning are dipped into a bath of cleaning agent and simultaneously subjected to a jet of cleaning agent) or when blasting a work piece with compressed air.

The device in accordance with the invention is particularly suitable for producing a pulsating fluid stream for use in a high pressure spray cleaning device in which a jet of pulsating cleaning agent having peak pressures of approximately 10 bar is produced.

In particular, cuttings can be removed from the cavities in a work piece by means of such a pulsating jet of cleaning agent.

Further features and advantages of the invention form the subject matter of the following description and the graphic illustration of an exemplary embodiment.

BRIEF DESCRIPTION OF THE DRAWINGS

FIG. 3 a schematic cross-section through the pulse valve of FIG. 2 along the line 3—3 in FIG. 2;

FIG. 4 a schematic longitudinal section through the pulse valve according to FIG. 2, but in an open position of the pulse valve;

FIG. 5 a schematic cross-section through the pulse valve of FIG. 4 along the line 5—5 in FIG. 4.

DETAILED DESCRIPTION OF EMBODIMENTS

Similar or functionally equivalent elements are designated in all of the Figures by the same reference symbols.

Figure 1:
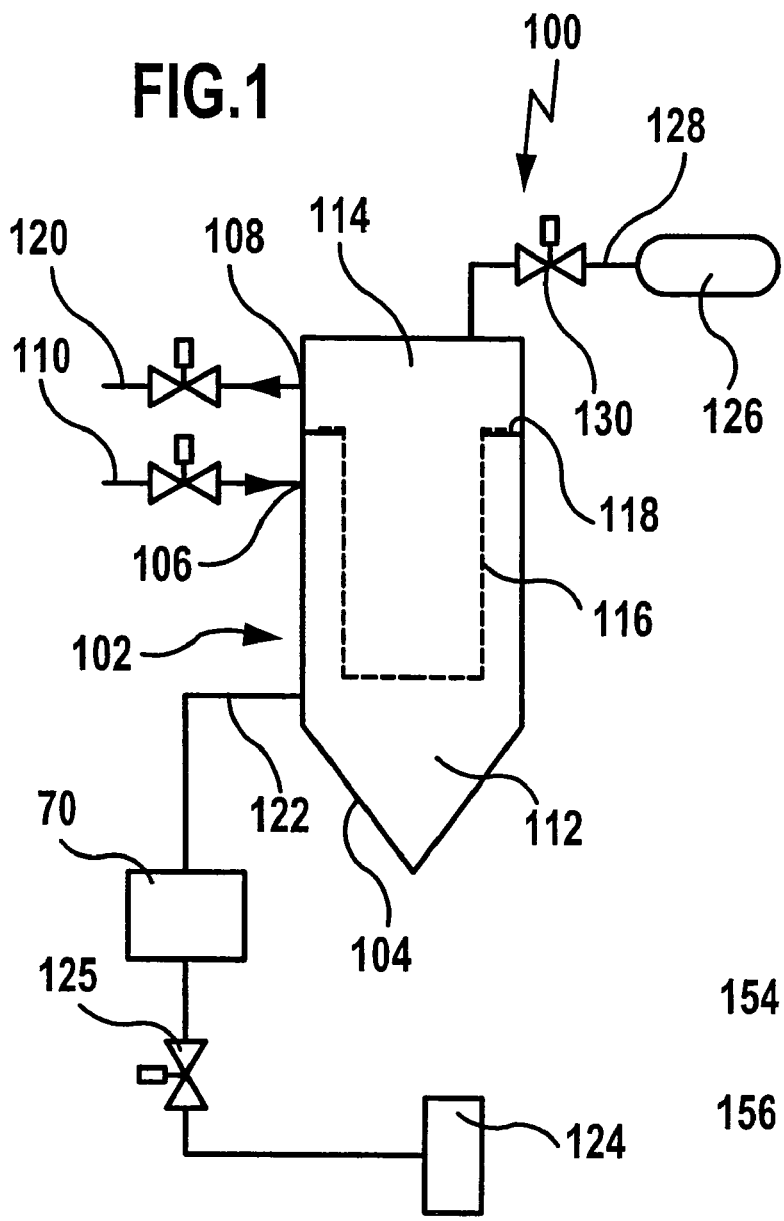
FIG. 1 shows a filter device incorporating a pulse valve for back-washing a filter.

A filter device that is illustrated schematically in FIG. 1 and bears the general reference 100 comprises a filter 102 having a filter housing 104 which comprises a filter inlet 106 and a filter outlet 108, wherein a supply pipeline 110, through which the dirty liquid requiring cleaning can be pumped under adjustable pressure into a lower chamber forming the dirty side 112 of the filter 102, is connected to the filter inlet 106. The dirty side 112 is separated from the filtrate side 114 by a filter medium which, here, is formed by a candle filter 116 that is in the form of a candle shaped filter screen and is hung on the edge of a boring in a separating plate 118.

When the filter is in operation, the liquid flows through the candle filter 116 from the outer side to the inner side thereof and, after passage through the interior of the candle filter 116, it emerges as filtrate at the filtrate side 114 of the filter 102; from there, the filtrate is discharged through the filter outlet 108 and is supplied to a consumer via the blockable discharge pipeline 120. There is a build-up of filtered impurities on the outer surface of the candle filter 116 as the duration of the filtering process increases.

In order to loosen these deposits from the filter walls and remove them from the dirty side 112 of the filter 102, a pulse valve 70 is arranged in an outlet pipeline 122 which merges into the dirty side 112 of the filter 102 and leads to a collecting chamber 124, said pipeline being blockable by means of a stop valve 125.

With the aid of the pulse valve 70, liquid can be transferred in the form of a pulsating stream having a certain, adjustable frequency from the interior of the filter 102 into the collecting chamber 124 by cyclically opening and closing the outlet pipeline 122.

Thereafter, a first separation of the heavy impurities from the liquid can take place in the collecting chamber 124 by sedimentation at increased pressure. As an alternative thereto, sedimentation could also be effected by the provision of a dwell phase during the back-washing phase so that pre-deposition of the heavy components would then take place by sedimentation at the dirty side 112 of the filter 102.

The effect of the pulse valve 70 can be increased still further by admitting compressed air into the dirty side 112 of the filter 102. To this end, a suitable compressed gas from an accumulator 126 can be supplied, in the open-state of the stop valve 130, through a supply pipeline 128 to the filtrate side 114 of the filter 102. Hereby, either the filtrate contained in the filtrate side 114 will be forced to stream through the filter walls in a direction opposed to the direction of filtering or the outer wall of the candle filter 116 will be cleaned exclusively by the compressed gas from the accumulator 126. In the case of such a back-washing process using a compressed gas, the supply pipeline 110 and the discharge pipeline 120 are closed and the stop valve 125 is opened.

The construction of the pulse valve 70 is illustrated in FIGS. 2 to 5.

Figure 2:
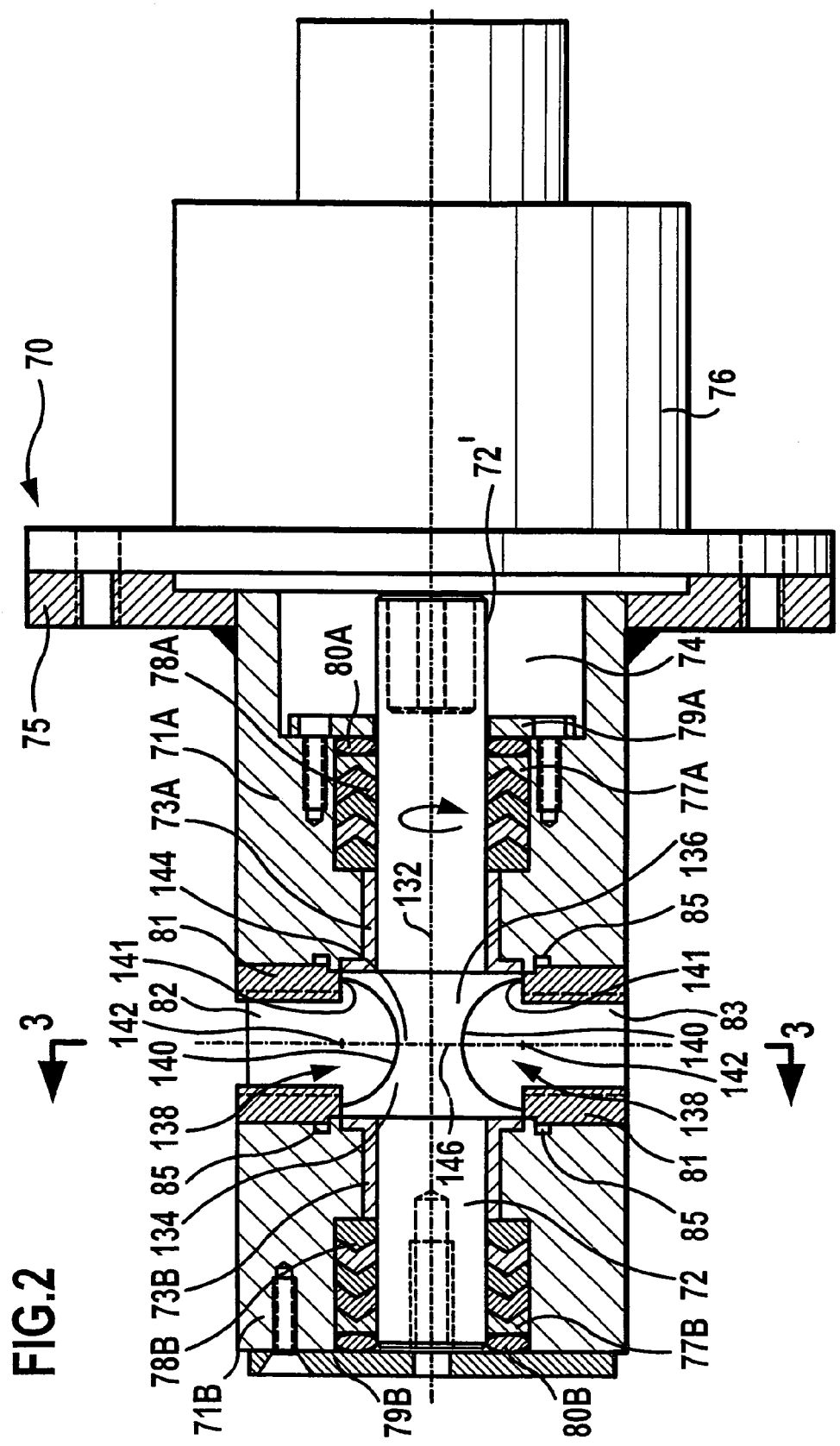
FIG. 2 a schematic longitudinal section through the pulse valve along a rotational axis of a blocking element of the pulse valve, in a closed position of the pulse valve.

As can be seen from FIGS. 2 and 4, the pulse valve 70 comprises a two-piece housing 71A, 71B, in which a shaft 72 serving as a blocking element is mounted by means of Permagleit bushings 73A, 73B such that it is rotatable about a rotational axis 132. The shaft end 72', which is illustrated at the right-hand side of FIGS. 2 and 4, lies freely in a drive coupling space 74 in the interior of the right-hand housing part 71A and is connected there in rotary-coupled manner to the drive shaft of a rotary drive motor 76 flanged onto a housing flange 75.

The rotary drive motor 76 may be a pneumatic or hydraulic rotary drive motor or an electric motor.

A respective packet 77A, 77B consisting of a plurality of polytetrafluorethylene thrust collars 78A, 78B adjoins the Permagleit bushings 73A, 73B at each end of the shaft, said packets being held in position through the intermediary of sealing rings 80A, 80B and by means of head plates 79A, 79B.

A ring 81 having a substantially cylindrical pulse valve inlet 82 and a substantially cylindrical pulse valve outlet 83 that is in alignment with the pulse valve inlet 82 is seated between the housing parts 71A, 71B, whereby the connectors of respective pipelines can be screwed into the pulse valve inlet 82 and the pulse valve outlet 83.

The ring 81 is inserted between the housing parts 71A, 71B and is sealed by means of O-rings 85, said parts being fixed together with the aid of not shown machine screws which are displaced relative to the pulse valve inlet 82 and the pulse valve outlet 83.

A blocking member 134 of the shaft 72 rotates within the ring 81, said member being of greater diameter than the adjacent portions of the shaft 72.

The blocking member 134 has a cylindrical outer surface 136 which is coaxial with the rotational axis 132.

Two diametrically opposite depressions 138 are formed in the outer surface 136 of the blocking element 134, said depressions being bounded by a respective boundary surface 140 in the form of a surface section of a cylinder whose cylinder axis 142 extends perpendicularly relative to the rotational axis 132, perpendicularly relative to the radial direction of the blocking member 134 and tangentially relative to the outer surface 136 of the blocking member 134, and it merges into the outer surface 136 of the blocking member 134 along an edge 141 (see FIG. 4).

The depressions 138 are formed in the blocking member 134 by milling out two segments in the form of cylindrical sections having mutually parallel axes 142 from the initially fully cylindrical blocking member 134, whereby the cylinder radius is smaller than the radius of the blocking member 134 so that a web portion 144 remains between the depressions 134 [sic].

In the closed position of the pulse valve 70 illustrated in FIGS. 2 and 3, the depressions 138 extend perpendicularly relative to the common axis 142 of the pulse valve inlet 82 and the pulse valve outlet 83 so that the passage from the pulse valve inlet 82 to the pulse valve outlet 83 is closed by the web portion 144 of the blocking member 134 remaining between the depressions 138.

When the shaft 72 has rotated on from the closed position of the pulse valve 70 illustrated in FIGS. 2 and 3 into the open position of the pulse valve 70 illustrated in FIGS. 4 and 5, the depressions 138 extend in parallel with the common axis 146 of the pulse valve inlet 82 and the pulse valve outlet 83. In this position, the upper depression 138a and the lower depression 138b open-out into both the pulse valve inlet 82 and into the pulse valve outlet 83 so that, in this open position, a fluid can reach the pulse valve outlet 83 from the pulse valve inlet 82 via both the upper depression 138a and the lower depression 138b.

In the angular positions of the shaft 72 which lie between the closed position of the pulse valve 70 illustrated in FIGS. 2 and 3 and the open position of the pulse valve 70 illustrated in FIGS. 4 and 5, the passage between the pulse valve inlet 82 and the pulse valve outlet 83 is only partially opened or closed.

Thus, by rotating the shaft 72, the pulse valve 70 is transferred cyclically from the closed state into the open state and then back again into the open state so that a pulsating fluid stream is produced through the pulse valve 70 by means of the pulse valve 70.

Due to the intermittent opening of the pulse valve 70, the discharge from the filter 102 is effected in batch-like manner. Due to the pressure peaks applied to the dirty side 112 of the filter 102 which are produced by the closing of the pulse valve 70, the deposits on the filter wall of the candle filter 116 are loosened and then washed away through the outlet pipeline 122.

Figure 6:
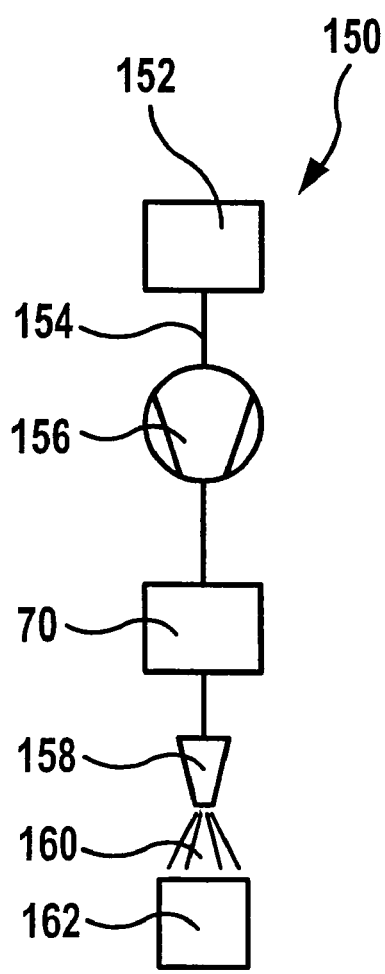
FIG. 6 a high pressure spray cleaning device incorporating a pulse valve.

A further type of application for the pulse valve 70 is illustrated in FIG. 6.

FIG. 6 shows a schematic illustration of a high pressure spray-cleaning device 150 which comprises a cleaning agent reservoir 152 from which a liquid cleaning agent is supplied through a supply pipeline 154 to a high pressure nozzle 158 via a high-pressure pump 156 and a pulse valve 70 of the type described hereinabove.

A pulsating jet of cleaning agent 160, which is used to remove dirt particles from a work piece 162 requiring cleaning, is produced at the high pressure nozzle 158 by means of the pulse valve 70.

Particularly effective removal of dirt particles from the work piece 162 is obtained as a result of the pulsation of the jet of cleaning agent 160.

What is claimed is:

1. A device for producing a pulsating fluid stream which comprises a fluid inlet, a fluid outlet, a fluid passage from the fluid inlet to the fluid outlet, and a blocking element, said blocking element being arranged between the fluid inlet and the fluid outlet and being rotatable about a rotational axis, the blocking element comprising a blocking member that cyclically closes and opens the fluid passage from the fluid inlet to the fluid outlet, wherein the blocking member comprises an outer surface and at least one recess in the form of a depression in the outer surface of the blocking member.

2. The device as claimed in claim 1, wherein the blocking element is in the form of a rotatably mounted shaft.

3. The device as claimed in claim 1, wherein the blocking element comprises a substantially cylindrical blocking member.

4. The device as claimed in claim 1, wherein the cross-section of the depression is substantially in the form of a segment of a circle.

5. The device as claimed in claim 4, wherein the depression has a substantially semicircular cross-section.

6. The device as claimed in claim 1, wherein the depression does not intersect the rotational axis of the blocking element.

7. The device as claimed in claim 1, wherein the depression comprises a boundary surface which is substantially in the form of a surface section of a cylinder.

8. The device as claimed in claim 1, wherein the depression extends substantially perpendicularly relative to a radial direction of the blocking element.

9. The device as claimed in claim 1, wherein the rotational axis of the blocking element is aligned transversely relative to a mean direction of flow of fluid through the device.

10. The device as claimed in claim 1, wherein the blocking element is rotatable at a rotational speed lying within the range of approximately 100 rpm to approximately 10,000 rpm.

11. The device as claimed in claim 1, wherein the device comprises a rotary drive for the blocking element, said drive having an adjustable rotational speed.

12. The device as claimed in claim 1, wherein the device comprises a pneumatic, hydraulic or electrical rotary drive for the blocking element.

13. A filter device comprising a filter and the device as claimed in claim 1 for cleaning said filter.

14. A cleaning device comprising a unit for producing a pulsating jet of cleaning agent, said unit comprising the device as claimed in claim 1.

* * * * *